US010328886B2

(12) United States Patent
Peyre et al.

(10) Patent No.: US 10,328,886 B2
(45) Date of Patent: Jun. 25, 2019

(54) MODULE COVER, ARRANGEMENT OF A MODULE COVER BETWEEN A VEHICLE ROOF AND A VEHICLE CEILING, AIRBAG MODULE, AND VEHICLE SAFETY SYSTEM

(71) Applicants: TRW AUTOMOTIVE GMBH, Alfdorf (DE); DALPHIMETAL ESPANA S.A., Vigo (ES)

(72) Inventors: Jean-Christophe Peyre, Vlana de Cega (ES); Ramon Ramos, Vlana de Cega (ES)

(73) Assignees: TRW AUTOMOTIVE GMBH, Alfdorf (DE); DALPHI METAL ESPANA S.A., Vigo (ES)

( * ) Notice: Subject to any disclaimer, the term of this patent is extended or adjusted under 35 U.S.C. 154(b) by 193 days.

(21) Appl. No.: 15/305,106

(22) PCT Filed: May 5, 2015

(86) PCT No.: PCT/EP2015/000916
§ 371 (c)(1),
(2) Date: Oct. 19, 2016

(87) PCT Pub. No.: WO2015/169437
PCT Pub. Date: Nov. 12, 2015

(65) Prior Publication Data
US 2017/0043738 A1 Feb. 16, 2017

(30) Foreign Application Priority Data

May 7, 2014 (DE) .................... 20 2014 003 779 U (51) Int. Cl.
*B60R 21/213* (2011.01)
*B60R 21/214* (2011.01)
(Continued)

(52) U.S. Cl.
CPC .......... *B60R 21/214* (2013.01); *B60R 21/215* (2013.01); *B60R 21/217* (2013.01);
(Continued)

(58) Field of Classification Search
CPC ... B60R 21/214; B60R 21/261; B60R 21/237; B60R 21/232; B60R 21/217;
(Continued)

(56) References Cited

U.S. PATENT DOCUMENTS 5,602,734 A * 2/1997 Kithil .................... B60N 2/002
180/282
6,142,506 A * 11/2000 Patel .................... B60R 13/025
280/728.2

(Continued)

FOREIGN PATENT DOCUMENTS

JP 2009182085 8/2009

*Primary Examiner* — Toan C To
(74) *Attorney, Agent, or Firm* — Tarolli, Sundheim, Covell & Tummino LLP (57) ABSTRACT

The invention relates to a module cover (40) for an airbag (10) and/or an airbag module for being arranged beneath a vehicle roof (56), especially in the area of an upper windscreen rim, wherein the module cover (40) comprises a module cover panel (41) having a rear side (42) pointing to the vehicle roof (56) during use and a front side (43) pointing away from the vehicle roof (56) during use. In accordance with the invention, the module cover panel (41) comprises an elongate clearance portion (44) preferably formed over the entire width (B) of the module cover panel (41) in the form of an elongate indentation (49) configured in the front side (43) of the module cover panel (41).

22 Claims, 7 Drawing Sheets

(51) Int. Cl.

| | |
|---|---|
| *B60R 21/215* | (2011.01) |
| *B60R 21/217* | (2011.01) |
| *B60R 21/232* | (2011.01) |
| *B60R 21/237* | (2006.01) |
| *B60R 21/261* | (2011.01) |
| B60R 21/16 | (2006.01) |
| B60R 21/231 | (2011.01) |

(52) U.S. Cl.
CPC .......... *B60R 21/232* (2013.01); *B60R 21/237* (2013.01); *B60R 21/261* (2013.01); *B60R 2021/161* (2013.01); *B60R 2021/23192* (2013.01); *B60R 2021/2612* (2013.01)

(58) Field of Classification Search
CPC ........ B60R 21/215; B60R 2021/23192; B60R 2021/161; B60R 2021/2612
USPC ................... 280/728.2, 728.3, 743.1, 730.1
See application file for complete search history.

(56) References Cited

U.S. PATENT DOCUMENTS

| | | | |
|---|---|---|---|
| 6,257,616 B1* | 7/2001 | Nowak | B60R 13/0212 280/730.2 |
| 6,913,280 B2* | 7/2005 | Dominissini | B60R 21/213 280/728.2 |
| 7,000,945 B2* | 2/2006 | Bakhsh | B60R 21/213 280/728.2 |
| 7,004,501 B2* | 2/2006 | Schneider | B60R 21/237 280/743.1 |
| 8,360,464 B2* | 1/2013 | Enders | B60R 21/206 280/728.2 |
| 2003/0052476 A1* | 3/2003 | Rose | B60R 21/2171 280/730.2 |
| 2005/0040627 A1* | 2/2005 | DePottey | B60J 3/0213 280/730.1 |
| 2006/0261508 A1* | 11/2006 | Lustiger | B29C 45/0005 264/140 |
| 2010/0225096 A1 | 9/2010 | Bustos Garcia et al. | |
| 2017/0158153 A1* | 6/2017 | Egusa | B60J 3/026 |

* cited by examiner

MODULE COVER, ARRANGEMENT OF A MODULE COVER BETWEEN A VEHICLE ROOF AND A VEHICLE CEILING, AIRBAG MODULE, AND VEHICLE SAFETY SYSTEM

RELATED APPLICATIONS

This application corresponds to PCT/EP2015/000918, filed May 5, 2015, which claims the benefit of German Application No. 20 2014 003 779.5, filed May 5, 2014, the subject matter of which are incorporated herein by reference in their entirety.

BACKGROUND OF THE INVENTION

The invention relates to a module cover for an airbag and/or an airbag module for being arranged beneath a vehicle roof, especially in the area of an upper windscreen rim, the module cover comprising a module cover panel including a rear side facing the vehicle roof during use and a front side facing away from the vehicle roof during use. In addition, the invention relates to an arrangement of a module cover between a vehicle roof and a vehicle roof lining. Moreover, the invention relates to an airbag module as well as a vehicle safety system.

From the state of the art so called bag-in-roof (BIR) airbag modules are known. They are usually arranged on the vehicle roof in the area or in the vicinity of the upper windscreen rim. For example, in WO 2007/014581 A1 such airbag module is described. In the case of activation, the airbag is inflated and thereby forced out of the casing and out of another cover. In the area of the airbag the cover includes a predetermined breaking point or an opening, resp., through which the airbag is forced into the interior of the vehicle and deploys there. It has turned out that the airbag deploying from the vehicle roof affects adjacent vehicle parts such as a sun visor. For example, such sun visor may be ruptured. This affects, inter alia, the further deployment behavior of the airbag.

SUMMARY OF THE INVENTION

It is the object of the present invention to describe a module cover for an airbag and/or an airbag module for being arranged beneath a vehicle roof which is developed so that the impact on adjacent vehicle parts and on the interior of the vehicle, resp., is reduced. Furthermore, it is the object to describe an arrangement of a module cover between a vehicle roof and a vehicle roof lining. In addition, it is the object of the invention to describe an airbag module as well as a vehicle safety system including a further developed module cover.

In accordance with the invention, with respect to the module cover this object is stated by the subject matter of claim 1, with respect to the arrangement of a module cover between a vehicle roof and a vehicle roof lining it is stated by the subject matter of claim 14, with respect to the airbag module it is stated by the subject matter of claim 15 and with respect to the vehicle safety system it is stated by the subject matter of claim 21.

The module cover according to the invention especially relates to module covers for an airbag and/or an airbag module for being arranged beneath a vehicle roof, preferably in the area of an upper windscreen rim. The module cover comprises a module cover panel including a rear side facing the vehicle roof during use and a front side facing away from the vehicle roof during use. In accordance with the invention, the module cover panel comprises an elongate clearance portion preferably formed over the entire width of the module cover panel which is in the form of an elongate indentation in the front side of the module cover panel. In other words, the elongate clearance portion is formed by an elongate indentation formed on the front side of the module cover panel. The elongate indentation can be equally formed over the entire width of the module cover panel. Accordingly, the longitudinal axis of the elongate clearance portion and/or of the elongate indentation preferably may extend over the entire width of the module cover panel.

In the case of activation of the airbag and/or of the airbag module the clearance portion reduces mechanical impacts on neighboring vehicle parts, as the clearance or distance of the module cover panel from a vehicle roof lining and/or from adjacent vehicle parts and/or from the vehicle interior is increased. Concretely speaking, the clearance portion is adapted so that collision of the module cover panel with vehicle parts such as the sun visor is prevented or at least weakened with respect to the collision forces.

Consequently, the invention relates to a further developed module cover comprising a module cover panel including an elongate clearance portion in the form of an elongate indentation preferably formed over the entire width of the module cover panel, wherein the elongate indentation is formed in the front side of the module cover panel.

The rear side of the module cover panel may include an elongate bulge preferably configured to be complementary to the elongate indentation in the clearance portion. The elongate indentation of the front side and the elongate bulge of the rear side can form a curved portion of the module cover panel, the curvature facing the vehicle roof during use. The elongate indentation of the front side and the elongate bulge of the rear side of the module cover panel may be designed to be congruent to each other, in this case, the elongate clearance portion may be formed, for example, by stamping and/or punching and/or a similarly acting forming operation of the portion of the module cover panel. The elongate clearance portion can be a hood-like shaping in the longitudinal section across the module cover panel in the side view, for instance.

The wall thickness of the module cover panel in the clearance portion may be designed to be continuous or constant in the longitudinal section. This can primarily be the case when in the clearance portion the rear side of the module cover panel has an elongate bulge formed to be complementary to the elongate indentation. The elongate indentation of the front side of the module cover panel may have a curved, especially concave shape. Due to such shaping an especially large clearance or distance can be provided between a module cover panel and a vehicle roof lining and/or a neighboring vehicle part and/or a neighboring vehicle interior and/or a sun visor.

In an embodiment of the invention the shape of the elongate clearance portion, especially the shape of the elongate indentation may be formed corresponding to the vehicle interior, especially corresponding to a sun visor. Since in the area of arranging an airbag and/or an airbag module provided beneath a vehicle roof, especially in the area of an upper windscreen rim the sun visor frequently constitutes the neighboring vehicle part, it is of particular advantage to match the shape of the elongate clearance portion, especially of the elongate indentation, to the shape of a sun visor. If the shape of the elongate clearance portion or of the elongate indentation is matched to the shape or contour of a sun visor, in an especially advantageous manner the distance between the module cover panel and a sun visor can be increased or maximized in the mounted state and, resp., during use so that in the case of activation of the airbag and/or of an airbag module the impact on the sun visor is minimized. A deformation of the sun visor which may also result in rupture of the sun visor, for example, is advantageously suppressed or prevented due to the formation of an elongate clearance portion.

The elongate indentation may be arranged in parallel to a fastening edge of the modular cover panel and/or in parallel to a free end of the module cover panel, with the free end of the module cover panel being configured to be opposed to the fastening edge. In other words, the module cover plate has two opposite sides, on the one side a fastening edge being formed and on the other side a free end of the module cover panel being formed. The fastening edge is arranged to face away from a windscreen during use and in the mounted state, resp., whereas the free end of the module cover panel feces the windscreen. The elongate indentation is formed between the fastening edge and the module cover, with the elongate indentation being arranged preferably in parallel to the fastening edge and/or the free end.

The fastening edge of the module cover panel can be an edge bent and/or curved from the front side of the module cover panel. In other words, the fastening edge of the module cover panel is approximately perpendicular to the front side of the module cover panel, the fastening edge pointing in the direction of the vehicle roof during use.

The depth of the elongate indentation may be ¼ to ¾ of the height of the fastening edge. The depth of the elongate indentation in other words describes the penetrating depth of the elongate clearance portion into the module cover panel. The depth of the elongate indentation has to be considered to be parallel to the height of the fastening edge.

The longitudinal extension of the clearance portion can be ¼ to ⅓ of the length of the module cover panel from the fastening edge to the free end. In other words, the length of the module cover panel is defined by the distance of the free end from the fastening edge. Based on this dimension, i.e. the length of the module cover panel, the longitudinal extension of the clearance portion may have a value which may be ¼ to ⅓ of the length value of the module cover plate, wherein the longitudinal extension of the clearance portion has to be considered to be parallel to the length of the module cover panel.

At least one fixing means may be arranged on the fastening edge of the module cover plate, with the fixing means being configured for being fastened to a connecting element, especially a connecting angle bracket, of the vehicle roof, especially of a roof cross member. In other words, the module cover panel or module cover can be mounted on a connecting element such as a connecting angle bracket with the aid of a fixing means arranged on the fastening edge of the module cover panel. Via the connecting angle bracket the module cover panel is arranged and/or fixed on the vehicle roof and/or a roof beam. The fixing means may be, for example, a fixing bolt and/or a fixing hook and/or a latch element. Preferably two fixing means are arranged on the fastening edge of the module cover plate spaced apart from each other.

The free end of the module cover plate may include a beading and/or may be bent outwardly at least in semicircular shape. Such design of the free end prevents the airbag from being damaged in the case of activation. Accordingly, the free end of the module cover panel and, resp., the edge of the module cover plate forming the free end of the module cover plate is bent outwardly at least in semicircular, especially three-quarter circular shape, wherein the indication of orientation of outwardly designates the direction pointing away from the vehicle roof. If in the case of activation the airbag is forced through the module cover according to the invention, especially along the free end of the module cover in the direction of a windscreen, the material and the fabric layers, resp., of the airbag cannot be damaged.

The module cover plate may furthermore have laterally configured clamping and/or latching portions. The lateral clamping and/or latching portions are preferably formed on opposite sides of the module cover plate, said sides being perpendicular to the free end and to the fastening edge of the module cover panel. Preferably the clamping and/or latching portions are formed on the sides in the vicinity of the free end. The clamping and/or latching portions serve, for instance, for connecting the module cover panel by clamping and/or latching to the vehicle and/or to further elements of the module cover.

The module cover moreover may comprise a protective sheath which is formed at least one the side of the module cover opposed to the module cover panel and forms the module cover together with the module cover plate, in other words, the protective sheath is formed or arranged between the module cover panel and the vehicle roof. The protective sheath primarily serves for the protection of an airbag provided with the module cover. Moreover, an extension of the protective sheath in the direction of the lateral edges of the module cover panel is imaginable. The protective sheath can be made of a softer and/or more elastic material as compared to the module cover panel.

Within the scope of an independent aspect, the invention is based on the idea to describe the arrangement of an afore-described module cover between a vehicle roof and a vehicle roof lining, wherein at the vehicle roof lining a sun visor including at least one fixing means is arranged so that the at least one fixing means is arranged in the area of the elongate clearance portion and/or the axis of movement of the sun visor extends in parallel to the elongate clearance portion.

In the case of activation of an airbag and/or airbag module the folded airbag covered by the module cover according to the invention is deployed, with the pressure of the deploying airbag acting on the module cover, especially on the module cover panel. Since the module cover panel is fixed, for example, on the fastening edge by a connecting angle bracket of a roof cross member, the free end of the module cover panel is swiveled relative to the vehicle roof, as the free end is not connected to the vehicle roof and merely lateral clamping and/or latching portions for arresting the module cover panel are provided in the area of the free end so that the free end of the module cover panel can be swiveled upon being pressurized. The deploying airbag forces the module cover panel against the vehicle roof lining. The vehicle roof lining preferably includes a predetermined breaking geometry in the transition area to the windscreen so that the airbag can be deployed and inflated along the windscreen through an orifice formed in this way.

Since the sun visor fastened to a vehicle roof lining via at least one fixing means is arranged so that the fixing means is arranged in the area of the elongate clearance portion and/or the movement axis of the sun visor extends in parallel to the elongate clearance portions the sun visor is not deformed in the case of activation. The fixing means and the movement axis, resp., of the sun visor are arranged in the area of the vehicle roof lining having the largest distance from the module cover panel due to the elongate clearance portion formed. Preferably the longitudinal axis of the sun visor is disposed in parallel and congruent to the elongate clearance portion of the module cover.

As regards an airbag module, the object is achieved by the features of claim 15. Accordingly, an airbag module for being arranged beneath a vehicle roof, especially in the area of an upper windscreen rim, comprises an afore-described module cover according to the invention.

The airbag module preferably comprises a folded airbag and an inflator for inflating the airbag, wherein the airbag includes an injection orifice and an inflating portion and the airbag is covered by means of the module cover according to the invention.

The airbag of the airbag module includes a guiding portion arranged between the injection orifice and the inflating portion, the inflating portion being furled starting from a trailing edge of the airbag in a first furling direction in the direction of the injection orifice and the guiding portion is formed by laying at least one folding with a first folding bend against the first furling direction such that the deploying behavior of the airbag can be influenced.

In other words, the airbag comprises three parts or three portions, namely an injection orifice, an inflating portion and a guiding portion, wherein the guiding portion is formed between the injection orifice and the inflating portion. Adjacent to the injection orifice in the longitudinal direction the guiding portion is formed, wherein the inflating portion is termed in the longitudinal direction adjacent to the guiding portion.

The guiding portion may be folded concertina-like at least in portions against the first furling direction. Moreover, it is imaginable that first and second folded layers of the guiding portion are laid starting from the first folding bend such that they form a first opening pointing in the direction of the injection orifice. The first opening therefore faces the first furling direction, in this context, an opening is understood to be the area of two folded layer arrangements which has no folding bend but enables access to such folding bend, in this context, a folding bend is understood to be the formation of a curvature as well as an edge and/or a fold.

In addition, in the second guiding portion a second folding bend may be formed, wherein the second folded layer and a third folded layer form a second opening pointing away from the injection orifice. The second opening therefore points in a direction opposed to the first furling direction. The first opening and the second opening thus are facing each other. The first opening and the second opening can be arranged in horizontal extension relative to each other and can be provided on a parallel line to the longitudinal axis of the airbag.

Furthermore, in the guiding portion a third folding bend may be provided to be formed, wherein starting from the third folding bend a third opening pointing in the direction of the injection orifice is formed by the third folded layer and a fourth folded layer. The first opening and the third opening accordingly point in the same direction, viz. the direction of the injection orifice and in the first furling direction, respectively. The second opening and the third opening consequently are facing each other. If in the guiding portion three folding bonds are formed, the guiding portion may be T-shaped in a side view.

The airbag moreover can have an additional folding, especially a zigzag folding of at least one side part of the furled inflating portion. The folding is carried cut at right angles with the first furling direction so that the folding bends formed and/or the edges and/or the folds are formed substantially in parallel to each other in the direction of the first furling direction.

The inflator of the airbag module may be a tubular inflator, for instance, the longitudinal axis of the inflator being located in parallel to the furled inflating portion of the airbag and/or perpendicularly to the first furling direction. For this reason, an airbag module can be made available in an especially space-saving shape.

It is equally possible to make use of a toroidal inflator instead of a tubular inflator.

In an embodiment of the invention, the guiding portion of the airbag can be arranged in the area of the elongate clearance portion of the module cover panel. In other words, the guiding portion of the airbag is arranged between the elongate clearance portion and a protective sheath and/or the vehicle roof. The elongate clearance portion, especially the elongate bulge of the rear side of the module cover panel therefore has the function of a guiding element, as in the case of activation of the airbag the gas flows through the injection orifice first into the guiding portion of the airbag, before it flows into the inflating portion of the airbag and deploys the same. Due to the formation of the elongate clearance portion, the deploying airbag is directed toward the free end of the module cover plate so that the folded guiding portion of the airbag deploys and thus forces the still furled inflating portion of the airbag out of the free end of the module cover. The guiding portion of the airbag and the elongate clearance portion thus cause the airbag to deploy in a well-directed manner along a windscreen, if the airbag module and the module cover according to the invention are arranged beneath e vehicle roof in the area of the upper windscreen rim and the free end of the module cover panel points in the direction of the windscreen.

As regards a vehicle safety system, the object is achieved by the features of claim 21. Accordingly, a vehicle safety system includes a module cover according to the invention and/or an airbag module according to the invention. Advantages similar to those illustrated already in connection with the afore-described module cover and/or with the airbag module according to the invention are resulting.

In an embodiment of the vehicle safety system the module cover and/or the airbag module are arranged between the vehicle roof and the vehicle roof lining in the area of an upper windscreen rim, with the module cover and/or the airbag module being formed such that upon release of the vehicle safety system an airbag can be deployed and inflated along the windscreen. The module cover, especially the module cover panel, swivels downwards away from the windscreen while the airbag deploys and inflates. Due to the constructional design of the module cover according to the invention, the impact of the module cover panel sniveling downwards on the vehicle parts mounted on the vehicle roof lining, especially on a sun visor, is minimized.

A sun visor is not deformed end/or destroyed in the case of activation of the vehicle safety system so that the vehicle occupant cannot be injured by breaking parts of the sun visor and/or deforming parts of the sun visor. Accordingly, a vehicle safety system is described which offers high occupant protection in connection with a bag-in-roof airbag module, as, on the one hand, the airbag of the vehicle safety system can be deployed and inflated along the windscreen and, on the other hand, the impact on neighboring vehicle parts during the deploying operation is minimized.

BRIEF DESCRIPTION OF THE DRAWINGS

Hereinafter the invention shall be illustrated in detail by way of embodiments with reference to the enclosed schematic drawings. Further features and advantages of the invention ere resulting from the following description in combination with said drawings, in which.

DESCRIPTION

Hereinafter the same reference numerals will be used for equal and equally acting parts.

Figure 1:
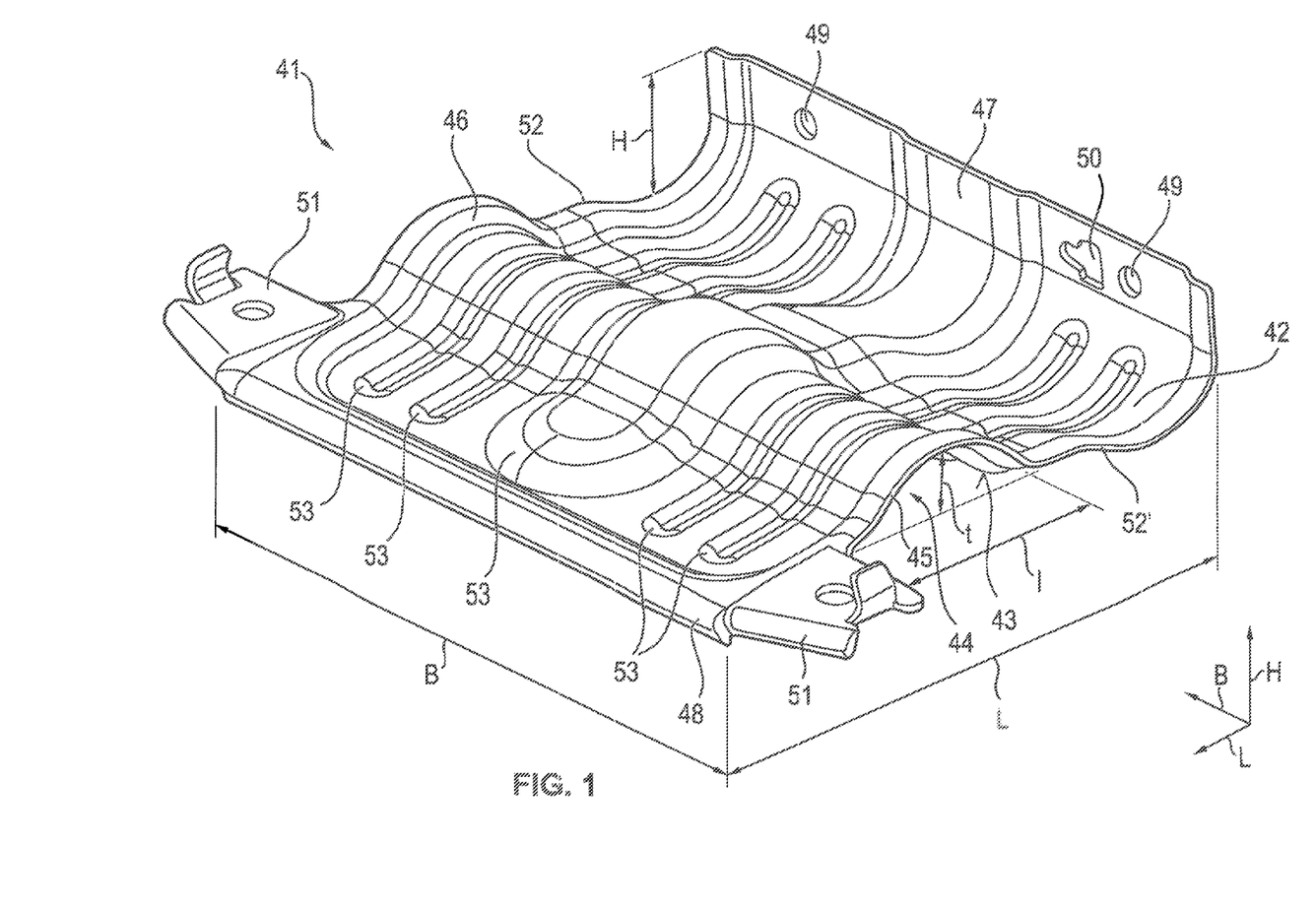
FIG. 1 shows a module cover panel of a module cover according to the invention.

FIG. 1 shows a module cover panel 41 of a module cover according to the invention. A module cover provided with such module cover plate 41 for an airbag and/or an airbag module serves for being arranged beneath a vehicle root especially in the area of an upper windscreen rim. The module cover panel 41 comprises a rear side 42 pointing to the vehicle roof during use and a front side 43 pointing away from the vehicle roof during use.

The module cover panel 41 includes an elongate clearance portion 44, preferably formed over the entire width B of the module cover panel 41, such that the front side 43 of the module cover panel 41 includes an elongate indentation 45 in the clearance portion 44. Elongate clearance portions 44 and elongate indentations 45, resp., in connection with the module cover panel 41 are understood to be portions or areas of the module cover panel 41 the longitudinal extension of which is larger than a depth-wise extension. Preferably the longitudinal extension of the elongate clearance portion 44 and, resp., of the elongate indentation 45 extends along the width B of the module cover panel 41. In an especially preferred manner and as shown in FIG. 1, the elongate clearance portion 44 is configured with its longitudinal extension over the entire width B of the module cover panel 41.

By means of the clearance portion 44 and the indentation 45 incorporated in the front side 43 a clearance to the closest-by vehicle pads is provided. Such vehicle part especially is a vehicle roof lining and the elements fastened thereto such as a sun visor, for example.

On the rear side 42 of the module cover panel 41 in the clearance portion 44 an elongate bulge 46 complementary to the elongate indentation 45 is formed. The elongate indentation 46 of the front side 43 and the elongate bulge 46 of the rear side 42 thus form a curved portion of the module cover panel 41. The clearance portion 44 thus includes an elongate bulge pointing to the vehicle roof during use. The elongate indentation 45 of the front side 43 and the elongate bulge 46 of the rear side 42 are formed to be congruent to each other.

In order to form the elongate clearance portion 44 with the indentation 45 and the bulge 46, said portion 44 of the module cover panel 41 may be reformed by stamping and/or punching, for example.

The wall thickness d of the module cover, especially of the module cover panel 41, is formed to be continuous in the clearance portion 44 in the longitudinal section. Hence the wall thickness of the module cover panel 41 is configured to be continuous and to have a constant wall thickness in the longitudinal contour. The indentation 45 has a curved, viz. a concave contour.

Figure 3:
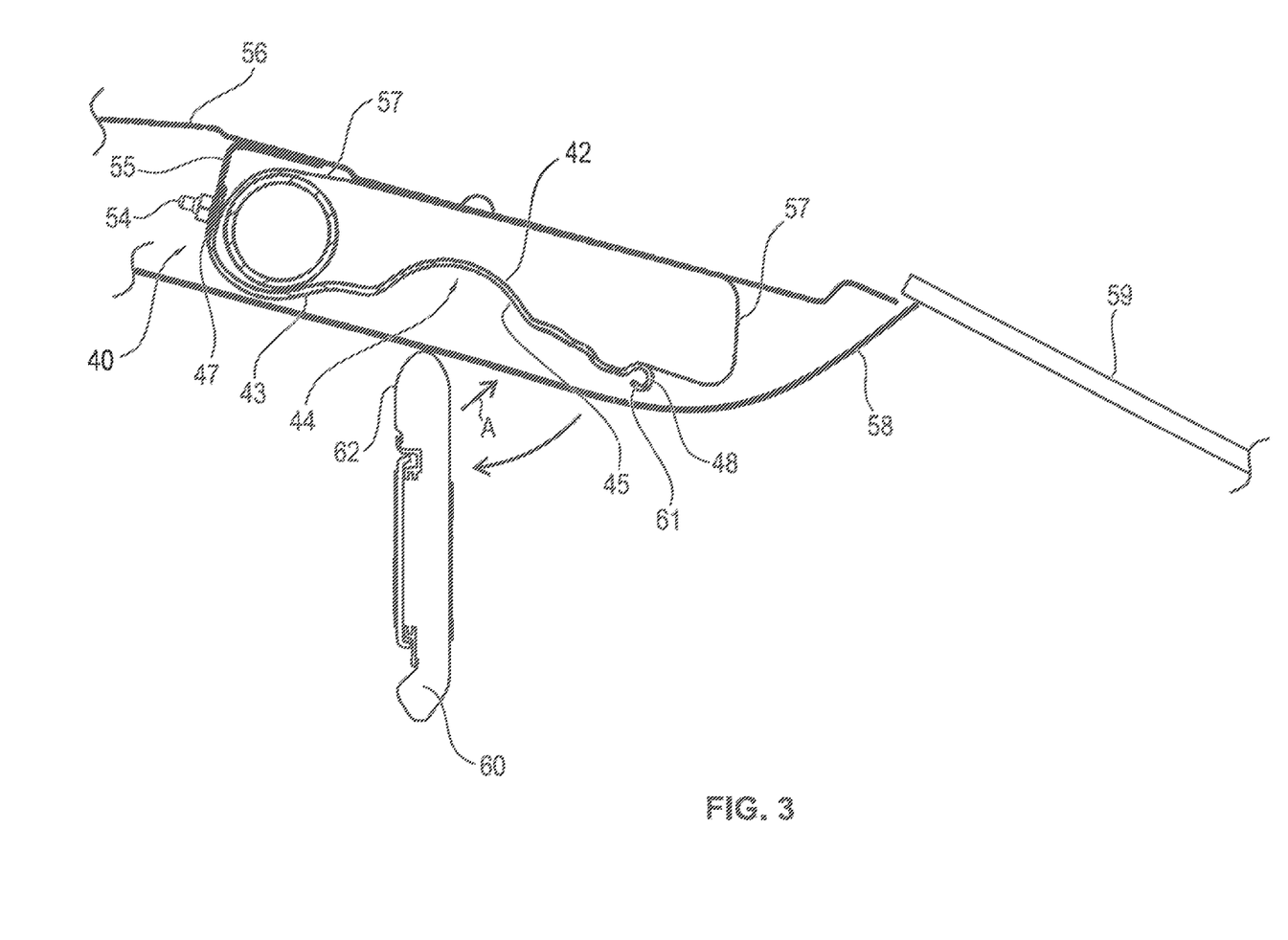
FIG. 3 shows an arrangement of a module cover between a vehicle roof and a vehicle roof lining.

The shape of the elongate clearance portion 44, especially of the indentation 45, may be formed to be corresponding to the vehicle interior, especially corresponding to a sun visor (cf. FIG. 3). The module cover panel comprises a fastening edge 47 as well as a free end 48. The fastening edge 47 and the free end 48 are configured to be parallel to each other opposed on the module cover panel 41. The fastening edge 47 corresponds to an edge bent from the front side 43 of the module cover panel 41 pointing in the direction of the vehicle roof during use.

On the fastening edge 47 bores 49 as well as a recess 50 are formed. Inter alia, they serve for arranging fixing means (not illustrated) which serve for fastening the module cover panel 41 and the module cover, resp., to a vehicle component, especially to a roof beam. The elongate indentation 46 and the elongate clearance portion 44, resp., are arranged in parallel to the fastening edge 47 as well as in parallel to the free end 48. The depth t of the elongate indentation 45 may be ¼ to ¾ of the height H of the fastening edge 47. The depth t of the elongate indentation 45 in other words describes the penetrating depth of the elongate clearance portion 44 into the module cover panel 41. The depth t of the indentation 45 thus has to be considered parallel to the height H of the fastening edge 47.

The longitudinal extension l of the clearance portion 44 may be ¼ to ⅓ of the length L of the module cover panel 41, with the length L of the module cover panel 41 corresponding to the distance of the fastening edge 47 from the free end 48. The linear dimension l of the clearance portion 44 has a value corresponding to ¼ to ⅓ of the length L of the module cover panel 41. The module cover panel 41 further includes laterally formed latching portions 51. The two latching portions 51 are formed on the opposite edges of the sides 52 and 52' of the module cover panel 41, said sides 52 and 52' being formed perpendicularly to the free end 48 as well as to the fastening edge 47 of the module cover panel 41. The latching portions 51 are formed in the vicinity of the free end 48. The latching portions 51 serve for a latching connection of the module cover panel to the vehicle.

Moreover, the module cover panel includes embossings 53 extending in the longitudinal direction L of the module cover panel 41. Said embossings serve for stiffening the module cover panel so that a relatively strong fixing of the module cover panel 41 to the fastening edge 47 with a root element is sufficient for locking the module cover.

Figure 2:
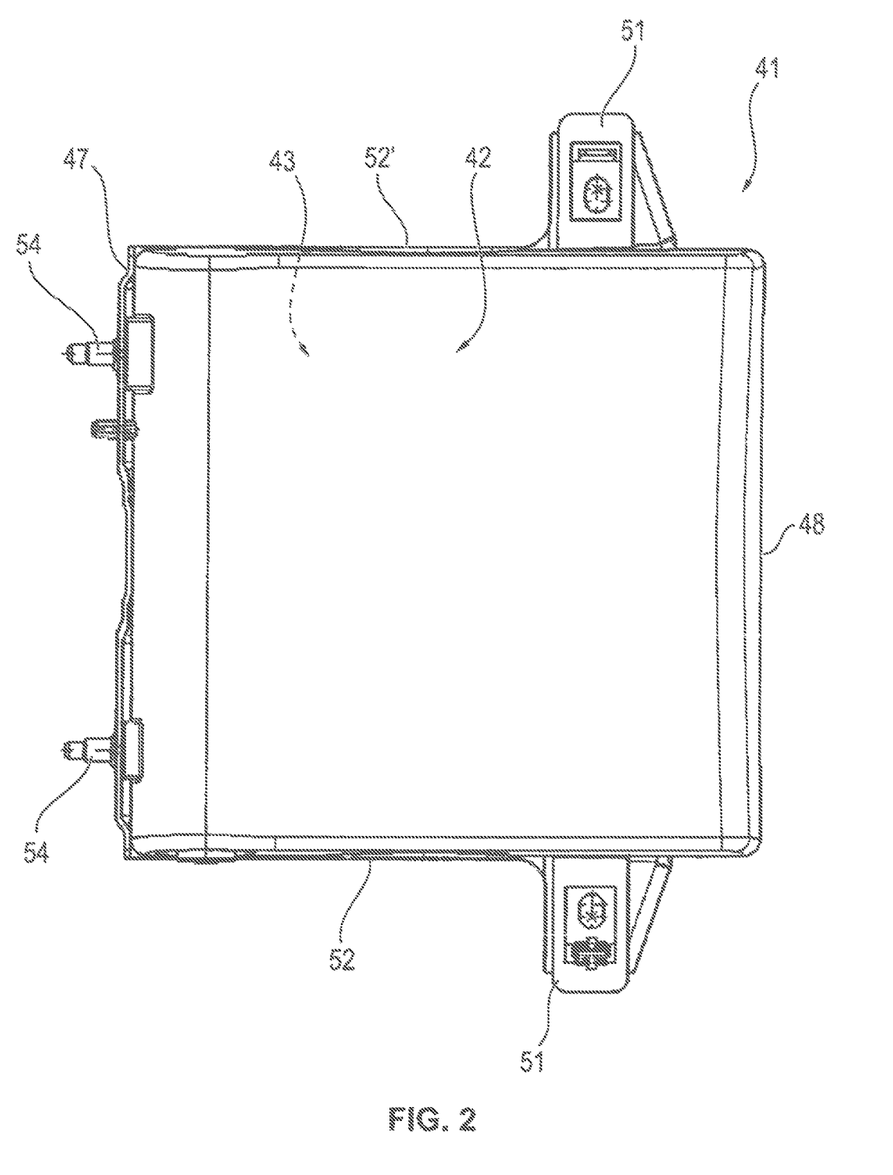
FIG. 2 shows a top view of a module cover panel.

In FIG. 2 the module cover panel 41 is shown in a top view. Accordingly, merely the rear side 42 of the module cover panel 41 is evident. Two fixing bolts 54 are arranged on the fastening edge 47. These fixing bolts are guided through the bores 49 of the fastening edge 47. The holes 49 and the fixing bolts 54, resp., are provided at the respective ends of the fastening edge 47, i.e. in the vicinity of the sides 52 and 52'.

FIG. 3 shows the module cover 40 in the mounted state. The fastening edge 47 fixed on a connecting angle bracket 55 by means of a fixing bolt 54 is evident. The connecting angle bracket 55 in turn is fastened on the vehicle roof 56 and on a roof beam, respectively. According to the representation of FIG. 3, the module cover 40 comprises a protective sheath 57 in addition to the module cover panel 41. Said protective sheath is formed at least on the side of the module cover 40 opposed to the module cover panel 41. Together with the module cover panel 41 the protective sheath 57 constitutes the module cover 40. In other words, the protective cover 57 extends from the module cover panel 41 to the vehicle roof 56 and a roof beam, respectively. The protective sheath 57 serves primarily for protecting an airbag 10 provided with the module cover 40 (cf. FIG. 4). Accordingly, the protective sheath 57 also extends in the direction of the sides 52, 52' or, resp., side edges of the module cover panel 41. The protective sheath 57 is made of a softer and/or more elastic material compared to the module cover panel 41.

In the shown mounted state the rear side 42 of the module cover panel 41 faces the vehicle roof or, resp., roof beam. The front side 43 of the module cover panel 41 points away from the vehicle roof 56, on the other hand. The module cover panel 41 is arranged in the longitudinal extension between a vehicle roof 56 and a vehicle roof lining 58 such that the free end 48 of the module cover panel 41 faces the windscreen 59. The free end 48 of the module cover panel 41 includes a beading 61 and is bent outwardly, i.e. in the direction of the vehicle roof lining 58, at least in semi-circular, in the present case in three-quarter circular shape. Such configuration of the free end 48 prevents an airbag 10 from being damaged in the case of activation.

The shape of the elongate clearance portion 44 as well as of the elongate indentation 45 is designed to correspond to the vehicle interior, especially to correspond to the sun visor 60. The indentation 45 is adapted to the upper contour 62 of the sun visor 60. The curved contour of the indentation 45 thus is formed relative to the contour 62 of the sun visor 60. Hence in an especially advantageous manner, the distance between the module cover panel 41 and the sun visor 60 may be increased or maximized in the mounted state of the module cover panel 41 so that in the case of activation of the airbag 10 the impact on the sun visor 60 is minimized. In the case of activation, the free end 48 of the module cover panel 41 is swiveled downwards in arc shape in the direction of the vehicle roof lining 48 according to the given arrow. The module cover panel 41 thus tears the vehicle roof lining 58 in a weakened zone so that the sun visor 60 mounted on the vehicle roof lining 58 is swiveled away from the windscreen 49 equally in a curved run. Due to the clearance portion 44 the sun visor 60 is prevented from being deformed or damaged.

Since the module cover panel 41 is fixed to the fastening edge 47 by the connecting angle bracket 55, the free end 48 may be swiveled in the case of activation relative to the vehicle roof 56, as the free end 48 is not tightly connected to the vehicle roof 56 and merely lateral clamping and/or latching portions 51 are provided for positioning the module cover panel 41. A deploying airbag 10 presses on the module cover 40 so that the protective sheath 57 preferably made of weaker material tears open and the airbag 10 can be deployed and inflated along the windscreen 59 through an opening formed in this way as well as through the torn vehicle roof lining 58.

In order to minimize the risk of destruction or damage of the sun visor 60 at best fixing means of the sun visor 60 are arranged in the area of the clearance portion 44. The axis of movement A of the sun visor 60 extends preferably in parallel to the elongate clearance portion 44. Since the fixing means of the sun visor or the axis of movement A of the sun visor 60, resp., is arranged in the area of the vehicle roof lining 58 being most distant from the module cover panel 41 due to the elongate clearance portion 44 formed, the sun visor 60 is not deformed in the case of activation.

Figure 4:
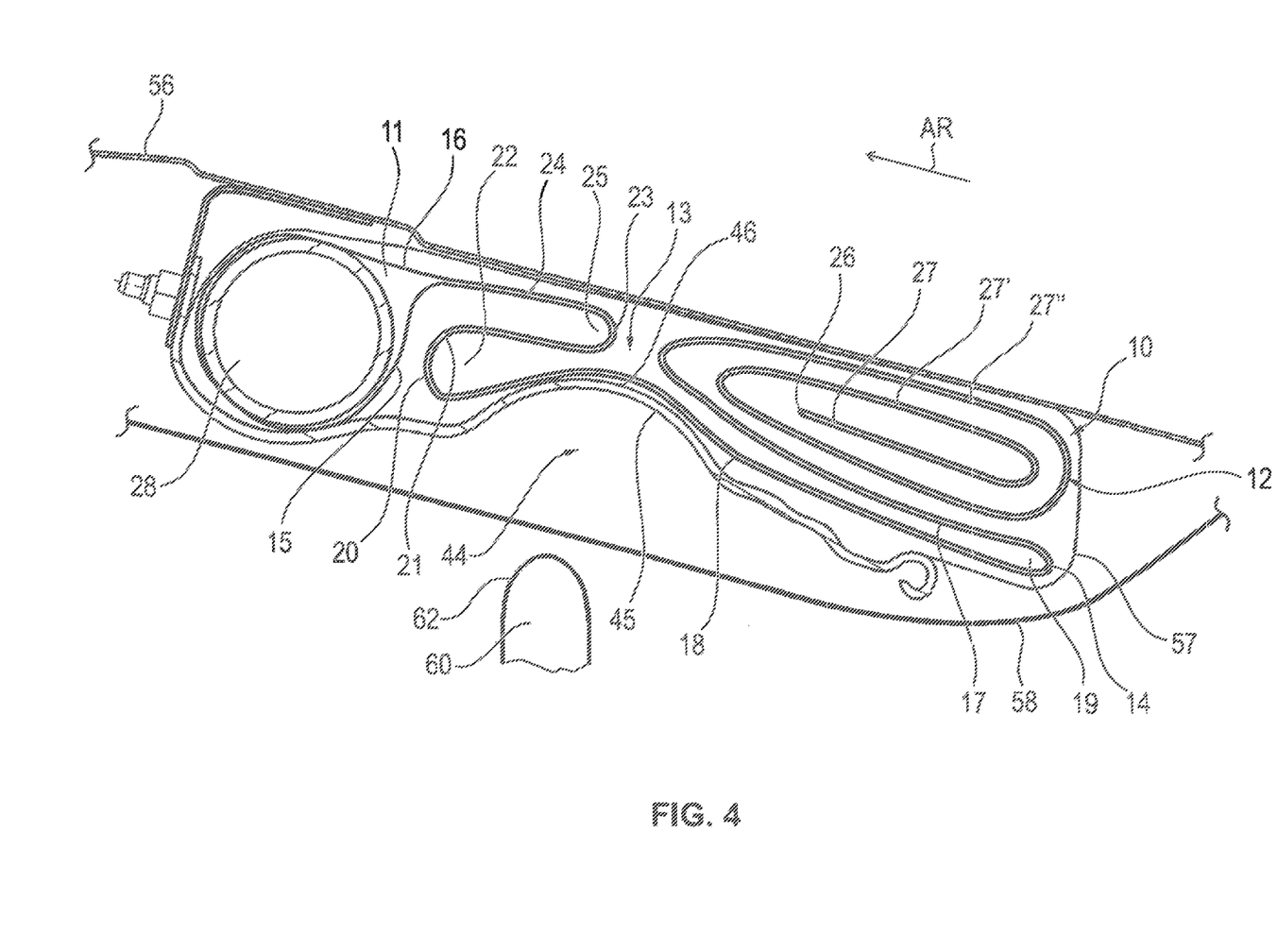
FIG. 4 shows an airbag module comprising a folded airbag in a modulo cover according to the invention.
Figure 5A:
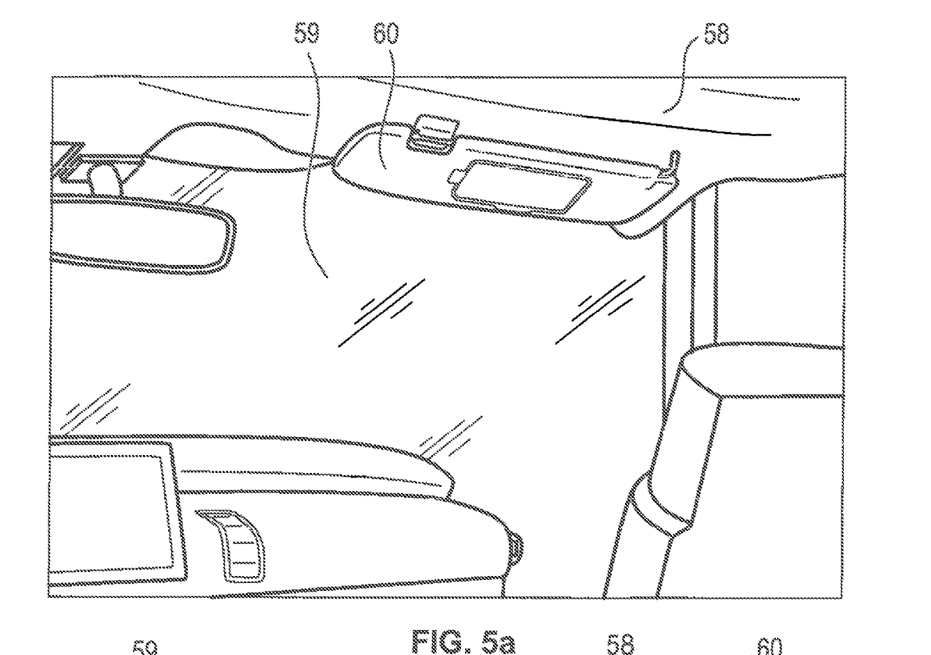
FIG. 5a-5e show individual phases of a release operation in combination with an airbag module according to the invention and a module cover according to the invention.
Figure 5B:
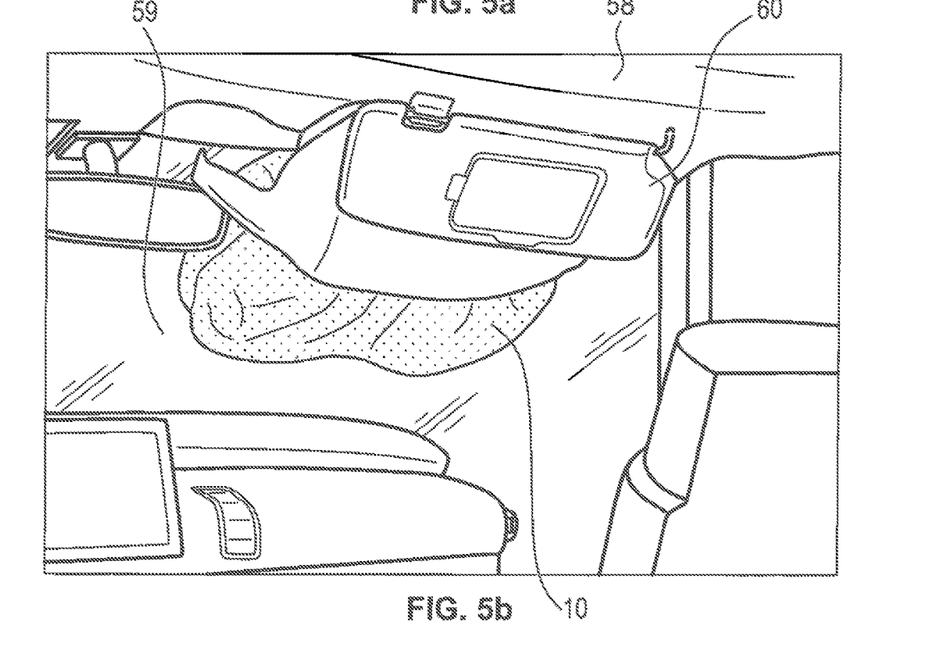
Figure 5C:
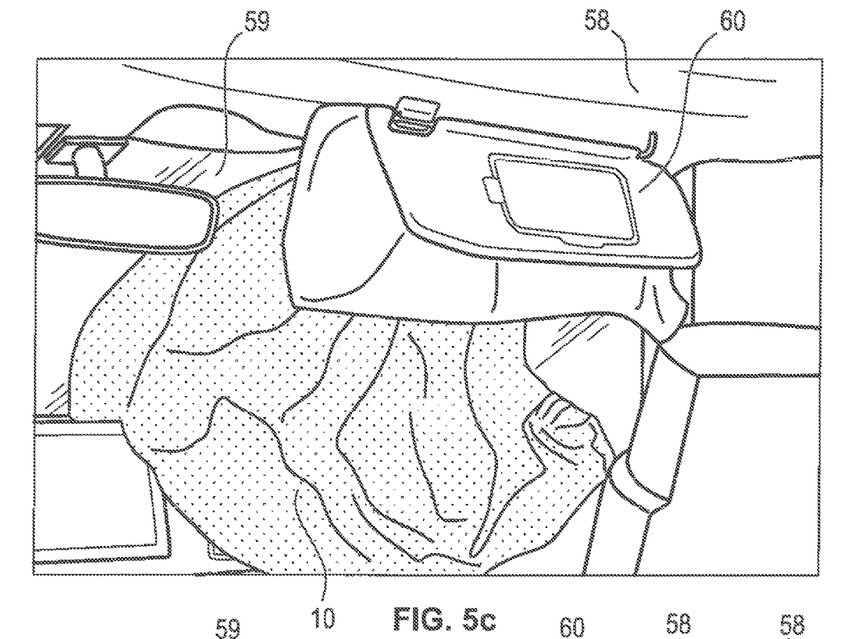
Figure 5D:
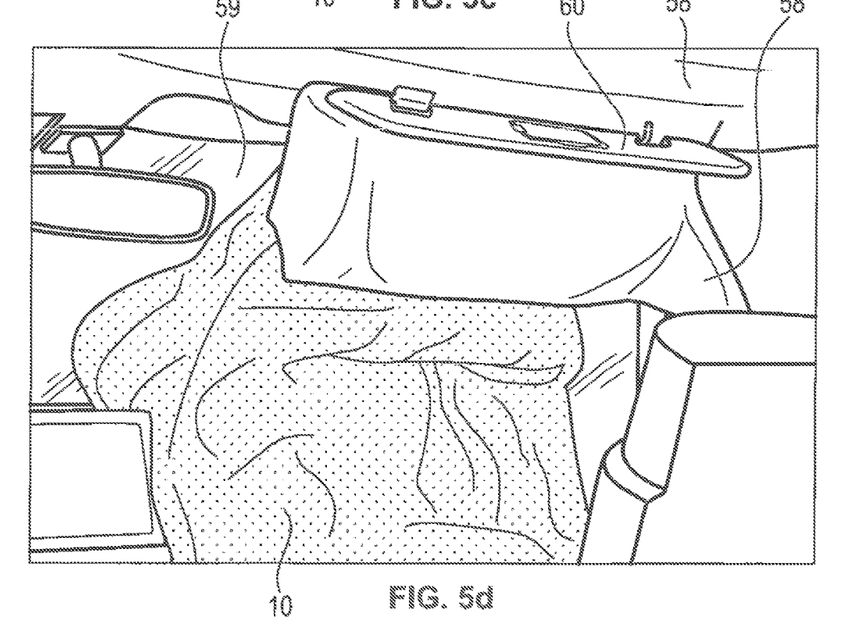
Figure 5E:
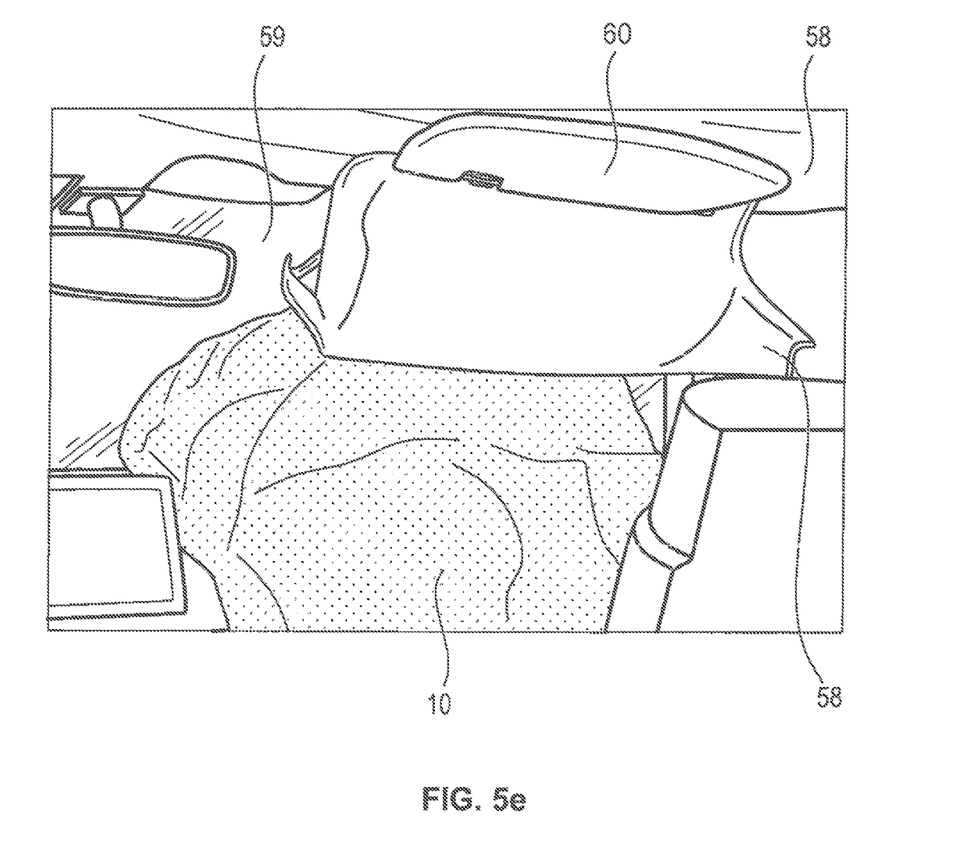

In FIG. 4 the module cover 40 according to the invention is shown in combination with an airbag module according to the invention. The airbag module comprises an airbag 10 in the folded state.

The airbag 10 comprises an injection orifice 11 as well as an inflating portion 12. Between the injection orifice 11 and the inflating portion 12 a guiding portion 13 is arranged. The inflating portion 12 is furled in a first furling direction AR pointing in the direction of the injection orifice 11. The guiding portion 13 is formed by laying at least one folding having a first folding bend 14 against the first furling direction AR so that the deploying behavior of the airbag 10 may be influenced. In the airbag 10 shown in FIG. 4 the upper side 15 and the lower side 16 are directly superimposed so that folding of the airbag 10 relates to both the upper side 15 of the airbag 10 and the lower side 16 of the airbag 16. Accordingly, an upper airbag layer, viz. the upper side 15, and a tower airbag layer, viz. the lower side 16, are arranged unchanged, preferably in parallel to each other, even during folding.

In the case of activation of the airbag 10 the gas flows through the injection orifice 11 first into the guiding portion 13 before it flows into the furled inflating portion 12 of the airbag 10 and deploys the same. By the inflowing gas first the guiding portion 13 configured with at least one folding bend 14 inflates. The folded guiding portion 13 of the airbag 10 deploys by the inflowing gas and thus forces the still furled inflating portion 12 out of the module cover 40. After that, the gas flows into the inflating portion 12 of the airbag 10 and fills the same. This method ensures that upon release the folded airbag 10, when appropriately mounted beneath the vehicle roof 56, preferably in the area of an upper windscreen rim, can be deployed and inflated along the windscreen 59.

The guiding portion 13 includes plural folded layers, with a first folded layer 17 and a second folded layer 18 of the guiding portion 13 being laid starting from the first folding bend 14 such that they form a first opening 19 pointing in the direction of the injection orifice 11. The opening direction of the first opening 19 thus corresponds to the furling direction AR. The first folded layer 17 and the second folded layer 18 are arranged in parallel to each other and can be or are positioned relative to each other by means of the first folding bend 14. The first folding bend 14 is curved, wherein in this context it is also possible to form an edge and/or a fold.

In the guiding portion 13 additionally a second folding bend 20 is formed, wherein starting from the second folding bend 20 a second opening 22 racing away from the injection orifice 11 is formed by the second folded layer 18 and a third folded layer 21. The second folded layer 18 and the third folded layer 21 are arranged in parallel and can be or are positioned relative to each other by means of the second folding bend 20. In this context, too, it may be provided to design the second folding bend 20 in curved shape as in the shown example and/or with an edge and/or a fold. The first opening 19 and the second opening 22 are facing each other, with the second opening 22 thus facing away from the inflation orifice 11. The second opening 22 consequently points in the direction opposite to the first furling direction AR.

In the guiding portion 13 a third folding bend 23 is formed, wherein starting from the third folding bend 23 a third opening 25 pointing in the direction of the inflation orifice 11 is formed by the third folded layer 21 and a fourth folded layer 24. Hence the opening direction of the third opening 25 corresponds to the opening direction of the first folding bend 24 and thus to the first furling direction AR. The third folded layer 21 and the fourth folded layer 24 are arranged in parallel to each other and are interconnected by the curved third folding bend 23 and, resp., are arranged relative to each other by means of the third folding bend 23.

According to the embodiment of FIG. 4, the guiding portion 13 comprises three folding bends 14, 20 and 23 so that in an appropriate side view the guiding portion 13 with the four folded layers 17, 18, 21 and 24 is T-shaped in the longitudinal section. What is crucial to the functioning of the airbag 10 is the design of the first folding band 14 which is folded or, resp., furled against the first furling direction AR. With the aid of the first folding bend 14 a first oppositely directed rolling fold is formed relative to the furled inflating portion 12.

In the case of activation, the gas is blown via the injection orifice 11 first in the direction of the third folding bend 23 so that the third folding bend 23 initially causes the second folding bend 20 as well as the first folding bend 14 to move horizontally, namely against the furling direction AR. Inflation of the second folding bend 20 and the first folding bend 14, too, causes the inflation behavior of the airbag 10 to be guided in the horizontal direction against the first furling direction AR so that the purpose of the guiding portion 13, i.e., influenced deployment of the airbag 10 along a windscreen 59, is satisfied. The guiding portion 13 also may merely include a first folding bend 14, i.e. merely a first folded layer 17 and a second folded layer 18. The formation of a second folding bend 20 and/or a third folding bend 23 is optional, but it enhances the effectiveness of the airbag 10.

The inflating portion 12 is arranged in the longitudinal extension of the airbag 10 adjacent to the guiding portion 13, the latter being adjacent to the injection orifice 11 in the longitudinal direction. The inflating portion 12 is furled, i.e. starting from the trailing edge 26 which in the spread state of the airbag 10 constitutes the edge of the airbag 10 that is maximally spaced apart from the injection orifice 11, the inflating portion 12 is furled in the furling direction AR, viz, in the direction of the injection orifice 11. Accordingly, plural layers 27, 27', 27" are formed each of which covers a preceding layer of the inflating portion 12. Accordingly, by furling the inflating portion 12 starting from the trailing edge 26 a winding is formed of three winding layers 27, 27', 27". The furling of the inflating portion 12 describes a winding operation which may be formed either with folding bends, as is shown in FIG. 4, or with edges and/or folds.

The airbag 10 is configured to be part of an airbag module. In the injection orifice 11 of the airbag 10 an inflator 28 is arranged. Preferably the inflator 28 is a tubular inflator, with the longitudinal axis of the inflator 28 extending perpendicularly to the first furling direction AR or, resp., in parallel to the longitudinal extension of the folding bends 14, 20 and 23.

As is shown in FIG. 4, the guiding portion 13 of the airbag 10 is arranged in the area of the elongate clearance portion 44 of the module cover plate 41. In other words, the guiding portion 13 and especially the second folded layer 18 of the airbag 10 is arranged between the elongate clearance portion 44 and the protective sheath 57 and, resp., the vehicle roof 56. The elongate clearance portion 44 and the elongate bulge 46, resp., of the rear side 42 of the module cover plate 41 thus has the function of a guiding element, as in the case of activation of the airbag 10 the gas flows through the injection orifice 11 first into the guiding portion 13 of the airbag, before it flows into the inflating portion 12 of the airbag 10 and deploys the latter. Due to the design of the elongate clearance portion 44 the deploying airbag 10 is directed toward the free end 48 of the module cover panel 41 so that the folded guiding portion 13 of the airbag 10 deploys and, after destruction of the protective sheath 57, thus forces the still furled inflating portion 12 of the airbag 10 out of the free end 48 of the module cover. The guiding portion 13 of the airbag 10 and the elongate clearance portion 44 thus cause the airbag 10 to deploy in a well-directed manner along the windscreen 59.

In FIGS. 5a to 5e the airbag module including an airbag 10 and a module cover 40 is shown in the mounted state. Accordingly, the airbag module formed as component of a vehicle safety system, wherein the airbag 10 as well as the pertaining module cover 40 are arranged between a vehicle roof 56 and the vehicle roof lining 58 in the area of an upper rim of the windscreen 49.

From FIGS. 5a to 5e the individual phases of a release operation in combination with an airbag module according to the invention are evident. It is visible that due to the design of a clearance portion 44 according to the invention the sun visor 60 is not destroyed. Moreover folding of the airbag along the windscreen 59 is shown. Accordingly, the inflated airbag 10 at first does not suddenly impact on the legs of the vehicle occupant but unfurls first along the windscreen 59 and then in the direction of the upper part of the vehicle occupant's body. Since the airbag 10 exhibits optimum deployment behavior and the sun visor 60 is not destroyed in the case of activation. Increased vehicle occupant protection is resulting.

LIST OF REFERENCE NUMERALS 10 airbag
11 injection orifice
12 inflating portion
13 guiding portion
14 first folding bend
15 upper side
16 lower side
17 first folded layer
18 second folded layer
19 first opening
20 second folding bend
21 third folded layer
22 second opening
23 third folding bend
24 fourth folded layer
25 third opening
26 trailing edge
27,27',27" layer of inflating portion
28 inflator
40 module cover
41 module cover panel
42 rear side
43 front side
44 elongate clearance portion
45 elongate indentation
46 elongate bulge
47 fastening edge
48 free end
49 bore
50 recess
51 latching portion
52, 52' side of module cover panel
53 embossing
54 fixing bolts
55 connecting angle bracket
56 roof beam
57 protective sheath
58 vehicle roof lining
59 windscreen
60 sun visor
61 beading 62 contour of sun visor
B width of module cover panel
H height/depth of module cover panel
L length of module cover panel
d wall thickness
t depth of indentation
l longitudinal extension of clearance portion
A axis of movement of sun visor
AR furling direction

The invention claimed is:

1. A module cover (40) for housing an airbag (10) and/or an airbag module between a vehicle roof (56) and the module cover, in the area of an upper windscreen rim, the module cover (40) comprising a module cover panel (41) including a rear side (42) pointing to the vehicle roof (56) during use and a front side (43) pointing away from the vehicle roof (56) during use, wherein the module cover panel (41) comprises an elongate clearance portion (44) in the form of an elongate indentation (45) formed in the front side (43) of the module cover panel (41), the elongate indentation extending into the module cover panel and toward the vehicle roof.

2. The module cover (40) according to claim 1, wherein the rear side (42) of the module cover panel (41) in the clearance portion (44) includes an elongate bulge (46) which is complementary to the elongate indentation (45).

3. The module cover (40) according to claim 1, wherein the wall thickness (d) of the module cover panel (41) in the clearance portion (44) is configured to be continuous in a longitudinal section.

4. The module cover (40) according claim 1, wherein the elongate indentation (45) has a curved shape.

5. The module cover (40) according to claim 1, wherein the shape of the elongate clearance portion (44), and the shape of the elongate indentation (45), are configured corresponding to the vehicle interior.

6. The module cover (40) according to claim 1, wherein the elongate indentation (45) is arranged in parallel to a fastening edge (47) of the module cover panel (41) and/or to a free end (48) of the module cover panel (41), wherein the free end (48) of the module cover panel (41) is formed to be opposed to the fastening edge (47).

7. The module cover (40) according to claim 6, wherein the fastening edge (47) of the module cover panel (41) is an edge bent and/or curved from the front side (43) which during use points to the direction of the vehicle roof (56).

8. The module cover (40) according to claim 7, wherein a depth (d) of the elongate indentation (45) is ¼ to ¾ of the height (H) of the fastening edge (47).

9. The module cover (40) according to claim 6, wherein a longitudinal extension (I) of the clearance portion (44) is ¼ to ⅓ of a length (L) of the module cover panel (41) from the fastening edge (47) to the free end (48).

10. The module cover (40) according to claim 6, wherein the free end (48) of the module cover panel (41) includes a beading (61) and/or is outwardly bent at least in a semicircular shape.

11. The module cover (40) according to claim 1, further comprising laterally formed clamping and/or latching portions (51).

12. An arrangement of a module cover (40) according to claim 1, between a vehicle roof (56) and a vehicle roof lining (58), wherein a sun visor (60) having at least one fixing means is arranged on the vehicle roof lining (58) so that the at least one fixing means is arranged in an area of the elongate clearance portion (44) and/or an axis of movement (A) of the sun visor (60) extends within the elongate clearance portion (44).

13. An airbag module for being arranged beneath a vehicle roof (56) in an area of an upper windscreen rim, comprising a module cover (40) according to claim 1.

14. A vehicle safety system comprising a module cover (40) and/or comprising an airbag module according to claim 13.

15. The vehicle safety system according to claim 14, wherein the module cover (40) and/or the airbag module is/are arranged between the vehicle roof (56) and the vehicle roof lining (58) in the area of an upper windscreen rim, wherein the module cover (40) and/or the airbag module is/are formed so that, upon release of the vehicle safety system, an airbag (10) can be deployed and inflated along the windscreen (59).

16. The module cover according to claim 1, wherein the elongate clearance portion is configured over an entire width of the module cover panel.

17. A module cover (40) for an airbag (10) and/or an airbag module for being arranged beneath a vehicle roof (56), in the area of an upper windscreen rim, the module cover (40) comprising a module cover panel (41) including a rear side (42) pointing to the vehicle roof (56) during use and a front side (43) pointing away from the vehicle roof (56) during use, wherein the module cover panel (41) comprises an elongate clearance portion (44) in the form of an elongate indentation (45) formed in the front side (43) of the module cover panel (41), and a protective sheath (57) which is formed at least on the side of the module cover (40) opposed to the module cover panel (41) and together with the module cover panel (41) constitutes the module cover (40).

18. An airbag module for being arranged beneath a vehicle roof in an area of an upper windscreen rim, the airbag module comprising:
a module cover (40) for the airbag module, the module cover (40) comprising a module cover panel (41) including a rear side (42) pointing to the vehicle roof (56) during use and a front side (43) pointing away from the vehicle roof (56) during use, wherein the module cover panel (41) comprises an elongate clearance portion (44) in the form of an elongate indentation (45) formed in the front side (43) of the module cover panel (41); and
a folded airbag (10) and an inflator (28) for inflating the airbag (10), wherein the airbag (10) comprises an injection orifice (11) and an inflating portion (12), wherein the airbag (10) includes a guiding portion (13) arranged between the injection orifice (11) and the inflating portion (12), wherein starting from a trailing edge (26) of the airbag (10) the inflating portion (12) is furled in a first furling direction (AR) in the direction of the injection orifice (11) and the guiding portion (13) is formed by laying at least one folding with a first folding bend (14) against the first furling direction (AR) such that the deployment behavior of the airbag (10) can be influenced.

19. The airbag module according to claim 18, wherein starting from the first folding bend (14) a first folded layer (17) and a second folded layer (18) of the guiding portion (13) of the airbag (10) are laid so that they form a first opening (19) pointing in the direction of the injection orifice (11).

20. The airbag module according to claim 19, wherein in the guiding portion (13) of the airbag (19) a second folding bend (20) is formed, wherein starting from the second folding bend (19) a second opening (22) pointing away from the injection orifice (11) is formed by the second folded layer (18) and a third folded layer (21).

21. The airbag module according to claim 20, wherein in the guiding portion (13) of the airbag (10) a third folding bend (23) is formed, wherein starting from the third folding bend (23) a third opening (25) pointing in the direction of the injection orifice (11) is formed by the third folded layer (23) and a fourth folded layer (24).

22. The airbag module according to claim 18, wherein the guiding portion (13) of the airbag (10) is arranged in the area of the elongate clearance portion (44) of the module cover panel (41).

\* \* \* \* \*